UNITED STATES PATENT OFFICE.

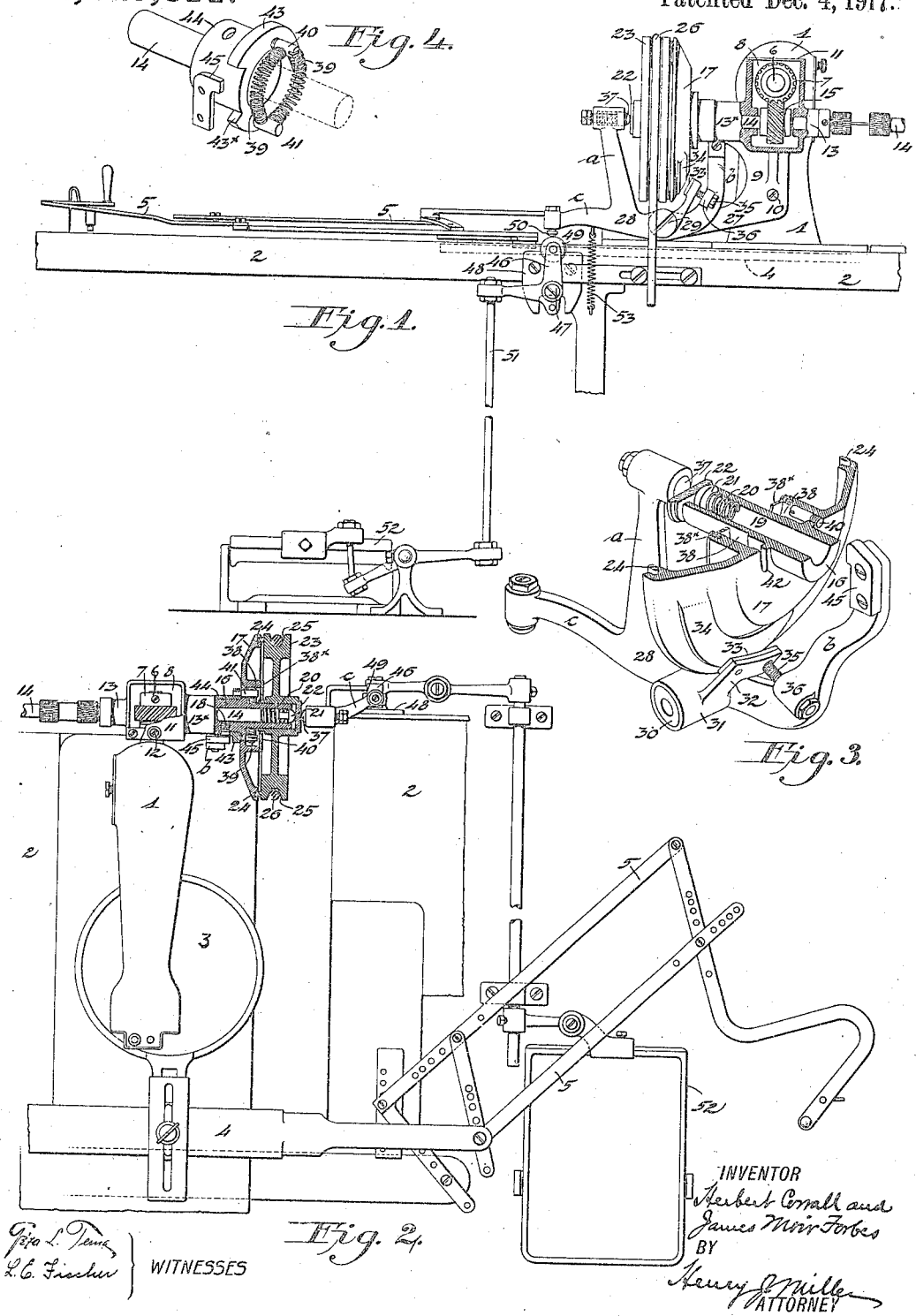

HERBERT CORRALL, OF HELENSBURGH, AND JAMES MOIR FORBES, OF SCOTSTOUN, SCOTLAND, ASSIGNORS TO THE SINGER MANUFACTURING COMPANY, A CORPORATION OF NEW JERSEY.

STOP-MOTION MECHANISM FOR SEWING-MACHINES.

1,248,811.  Specification of Letters Patent.  Patented Dec. 4, 1917.

Original application filed February 9, 1914, Serial No. 817,458. Divided and this application filed April 26, 1916. Serial No. 93,611.

*To all whom it may concern:*

Be it known that we, HERBERT CORRALL and JAMES MOIR FORBES, subjects of the King of the United Kingdom of Great Britain and Ireland, residing, respectively, at Parkview, Helensburgh, Dumbartonshire, Scotland, and Scotstoun, Scotland, have invented certain new and useful Improvements in Stop-Motion Mechanisms for Sewing-Machines, of which the following is a specification, reference being had therein to the accompanying drawings.

This invention relates generally to stop-motion mechanism for controlling the driving connection between a driving-wheel and a shaft and more particularly to a stop-motion especially adapted for use in conjunction with a series or train of embroidery sewing machines arranged to operate simultaneously in connection with moving work-holders controlled by a manually-actuated pantograph device, as disclosed in our co-pending application Serial No. 817,458, filed February 9, 1914, of which this application is a division. The mechanism includes a bracket provided with an integral oil-chamber which receives a helical gear-wheel fixed to the main-shaft of a sewing machine and engaging a like gear-wheel upon a shaft extending transversely of said oil-chamber and rotating within bearing bosses provided by the bracket. Fixed upon the outer end of the latter shaft is a driven wheel or friction disk provided with a projecting hub upon which is slidingly mounted a driving-wheel adapted to be thrown into engagement with the friction disk but normally pressed out of engagement therewith by a coiled spring within said projecting hub. A plural armed rock-lever is employed to throw the driving-wheel into and out of operative engagement with the friction disk and also to apply a brake to the latter when it is released. To stop the friction disk in such position that the needle is above the work and to absorb the shock produced by the sudden arrest of the disk the latter is provided with two springs contained within a chamber concentric with its hub, each spring being connected to a pin secured to a collar loosely mounted upon and normally rotating with the hub of the disk. When the rock-lever is actuated to release the disk from contact with the driving wheel, a trip or stop element carried by said lever locks the aforesaid collar against movement, whereby the momentum of the disk is taken up by the compression of one spring and the expansion of the second spring, in conjunction with the action of the brake element carried by said lever. The rock-lever is operated by a bell-crank provided with a roller which engages the point of a pin secured to a projecting arm of the lever, the bell-crank being connected to the upper end of a pin secured at its lower end to a treadle device. By such arrangement the operator has positive control of the driving elements, and by movement of the bell-crank from one extreme position to the other can cause the machines to be stoped automatically at the termination of each stitch; or by movement of the bell-crank to mid-way position and in constant engagement with the rock-lever can cause the machines to produce stitches uninterruptedly.

In the accompanying drawings, Figure 1 is a side elevation, partly in section, of the present improvements, and Fig. 2 is a plan view, partly in section, of the same. Fig. 3 is a perspective view of the plural armed rock-lever, and the driven wheel or disk, showing the latter in section. Fig. 4 is a perspective view of the collar and of the trip element.

The invention is shown applied to a sewing machine 1, comprising the first of a train of embroidery machines, supported upon a table or stand 2, the work-holder 3 of the machine being adjustably connected to a supporting bar 4 to which movements are imparted by means of the pantograph 5. The main-shaft 6 of the sewing machine is provided with a helical gear 7 which is received within an oil chamber 8 formed integrally with a bracket 9 secured to the sewing machine standard by means of screw 10; said oil chamber being provided with a removable cap 11 pivotally secured to the bracket by means of stud screw 12. At opposite sides of the oil chamber are formed bearing bosses 13 and 13× to receive a shaft 14 extending transversely of the oil chamber and supporting the helical gear-wheel 15 which engages the like wheel on main-shaft 6 of the sewing machine. In the present instance boss 13ˣ is enlarged to conform with the diametrical proportion of the hub 16 of a driven wheel or friction disk 17 fixed upon shaft 14 by means of screw 18. The hollow hub 16 of friction disk 17 projects beyond the end of shaft 14, thus providing a chamber 19 to receive a coiled spring 20 which rests between the end of shaft 14 and the head of pin 21, the latter being pressed upon the hardened steel cap 22 of driving wheel 23 which is loosely fitted upon the said projecting hub of the disk. The spring 20 acts normally to disengage the face of driving wheel 23 from contact with a ring 24 of leather or the like fitted within an annular groove formed in the inner face of the friction disk. The driving wheel 23 is provided with the usual peripheral groove 25 to receive driving belt 26 which in practice is driven by a motor or other power device.

In the present instance bracket 9 is provided with a laterally projecting foot 27 which serves as a support for the plural-armed operating rock-lever 28, said lever being pivoted upon the bracket foot by means of a stud screw 29 which enters an aperture formed within the hub 30 of said lever, the enlarged head of screw 29 serving to confine upon the sleeve 31 of a brake-arm 32 provided with a brake-shoe 33 adapted to contact with inclined surface 34 upon friction disk 17, said surface constituting a stop element for the disk. The brake-arm 32 rests upon the end of a screw 35 adjustable within boss 36 upon one arm $b$ of the rock-lever 28.

The arm $a$ of the rock-lever is enlarged at its extremity and provided with a socket to receive a spring plunger-pin having the rounded head 37 which is disposed adjacent the cap 22 of driving-wheel 23. It will be seen that the movement of rock-lever 28 to the left from the position shown in Figs. 1 and 2 will carry the plunger pin away from the driving-wheel, thus permitting spring 20 to move said wheel out of operative engagement with the disk 17, it being apparent that such movement of the lever will carry brake-arm 32 in position to engage inclined surface 34 of the driving-wheel. The reverse movement of the lever 28 will move the driving-wheel 23 axially against the action of spring 20 whereby the face of the driving-wheel will be brought into frictional engagement with ring 24 upon the disk and rotary movement will be transmitted to said disk and the main-shaft 6 of the sewing machine.

To stop the friction disk at a given point and to absorb the shock produced by the sudden arrest thereof, the disk is provided with coiled springs housed within an annular chamber 38 surrounding its hub, said chamber being closed by cap 38ˣ. One end of each spring 39 is connected to a pin 40 secured to the disk, and the opposite ends of the springs are connected to a pin 41 projecting within annular chamber 38, said pin passing through a concentric slot 42 formed in the disk 17 and being fixed to the flange 43 of a collar 44 loosely mounted upon the hub 16 of said friction disk and normally rotating therewith. The flange 43 of said collar is cut away to provide a gap and opposed shoulders 43ˣ. When lever 28 is rocked to stop the machine a trip or stop element 45 upon arm $b$ of the rock-lever enters the gap formed in the flange of collar 44 and engages one of the shoulders 43ˣ, whereby the collar is held against rotation and the momentum of the friction disk is overcome by the compression of one spring and the expansion of the second spring, aided by the action of brake 32 upon the stop-surface 34.

The operating means for rock-lever 28 comprises a bell-crank 46 pivoted by means of screw stud 47 to a bracket 48 secured to the table or stand 2, said bell-crank being provided with a roller 49 adapted to engage the point of a pin 50 secured to the outer extremity of the arm $c$ of lever 28. The bell-crank is secured to the upper end of a rod 51 operatively connected at its lower end to a treadle device 52 of any suitable construction. A spring 53 secured to the table and connected to the rock-lever tends to tilt the latter to carry arm $a$ out of engagement with the driving wheel and the brake and trip elements into engagement with the friction disk. It will be seen that the bell-crank 46 in its mid-way position, shown in Figs. 1 and 2, will hold arm $c$ of the rock-lever elevated and the driving-wheel in operative engagement with the driven wheel and thus will effect a continuous operation of the machine while it remains in such position. To start the machine and permit it to be stopped automatically at the termination of each stitch-forming operation, the bell-crank 46 is moved from one extreme position to the other whereby the roller 49 engages the pin 50 on arm $c$ of the lever 28, and causes the spring plunger carried by arm $a$ to engage the cap 22 on the driving-wheel 23 which is thus moved axially against the action of the spring 20 so that its face is brought into engagement with the ring 24 upon the friction disk 17 and thereby rotates said disk and the shaft 4. On the said upward movement of the arm $c$ the brake-shoe 33 is disengaged from the driven wheel 17 and the trip element 45 on the arm $b$ is disengaged from the gap portion of the flange collar 44, remaining in disengaged position until the wheel 17 has made one complete revolution and the gap again comes into register with the trip element 45 which is thereupon moved into the gap by the action of the spring 53, the brake-shoe 33 being simultaneously applied to the stop surface 34 of the wheel 17, whereby further rotation of said disk is prevented to arrest the mainshaft in the sewing machine head, the adjustment of the parts being such that the needle carried by the needle-bar on the machine is clear of the work.

It will be understood that while the invention is described in conjunction with a train of embroidery machines, it is capable of use for controlling the driving shaft of various other types of machines, and that various changes may be made in the construction and arrangement of the parts, it being manifest that the invention is not limited to the precise embodiment thereof herein shown and described.

Having thus set forth the nature of the invention, what we claim herein is:—

1. In stop-motion mechanism for sewing machines, the combination with a driving shaft and a friction disk fixed to and provided with a hollow hub projecting beyond said shaft, of a driving wheel slidingly mounted upon said hub, a spring within the hub and acting upon the driving wheel to move the same axially, a stop element projecting from the friction disk and having an outwardly inclined surface, a rock-lever provided with a member adapted to engage the inclined surface of said stop element and with a shifting member for said driving wheel, and means including a treadle device for operating said rock-lever to carry one of its members into effective position and simultaneously to carry the other member into ineffective position.

2. In stop-motion mechanism for sewing machines, the combination with a shaft operatively connected with the stitch-forming elements of a sewing machine, and a friction disk fixed to said shaft and provided with a hollow hub projecting beyond the same and with a spring within said hub, of a driving wheel slidingly mounted upon said hub and engaged by said spring, a stop element upon the friction disk, a rock-lever provided with two members adapted to engage respectively said stop element and the driving wheel, a spring normally acting to move the lever to stopping position, a treadle actuated bell-crank, and connections between said bell-crank and the lever, whereby movement of said bell-crank from either extreme position to the other will start the machine and permit it to stop automatically at the completion of a stitch-forming cycle.

3. In stop-motion mechanism for sewing machines, the combination with a driving shaft and a friction disk fixed to said shaft and provided with a hollow hub projecting beyond the same and with a spring within said hub, of a driving wheel slidingly mounted upon said hub and engaged by said spring, a stop element projecting from the friction disk and having an inclined surface, a rock-lever provided with a shifting arm for the driving wheel, a contact member adapted to engage said stop element, means for adjusting said contact member relatively to said shifting arm, and means for tilting said rock-lever to carry the shifting arm into ineffective position and simultaneously to carry the contact member into effective position.

4. In stop-motion mechanism for sewing machines, the combination with a driving shaft and a friction disk fixed to said shaft and provided with a laterally projecting hub, of a driving wheel slidingly mounted upon said hub, a spring normally pressing said driving wheel out of engagement with said friction disk, a rock-lever provided with a shifting arm for the driving wheel, a spring connected to and normally rotating bodily with said friction disk, a trip element carried by said rock-lever, and means for operating said rock-lever to retract said shifting arm and simultaneously to carry said trip element into operative relation with said friction disk spring.

5. In stop-motion mechanism for sewing machines, the combination with a driving shaft and a concentrically slotted friction disk fixed to said shaft and provided with a hub which projects laterally at opposite sides of said disk and with an annular chamber surrounding said hub at one side of said disk, of a coiled spring received within said chamber and connected at one end to said disk, a notched collar loosely mounted upon said hub at the side of said disk opposite said chamber and provided with a projection extending through the slot in said disk and engaging the opposite end of said spring, a driving wheel movable into and out of engagement with said friction disk, a rock-lever provided with a shifting arm for said driving wheel and with a stop element for said collar, and means for operating said rock-lever to retract said shifting arm and simultaneously to carry said stop element into engagement with the notched portion of said collar.

6. A stitch-by-stitch stop-motion mechanism for sewing machines comprising, in combination, a driving element, a driven element, a spring-controlled element movable to running position against the action of its spring to effect engagement of said driving and driven elements, means for detaining said spring-controlled element in running position until the completion of one revolution of said driven element, means for releasing said spring-controlled element and stopping said driven element at the end of one revolution of the latter, and a treadle controlled rocking element adapted when moved from either of its extreme positions to the other to shift said spring-controlled element to running position.

7. A starting and stopping device for sewing machines comprising, in combination, a driving element, a driven element, means including a starting and stopping lever for effecting driving engagement between said elements, automatic means for effecting the return of said starting lever to stopping position at the end of one revolution of said driven element, and treadle controlled means adapted to move said starting lever to starting position when said treadle is moved from either of its extreme positions to the other.

8. In stop-motion mechanism for sewing machines, in combination, a driving shaft, a friction disk fixed to said shaft, a driving disk concentric with said shaft and movable toward and from said friction disk, a stop-device carried by and disposed at the side of said friction disk remote from the driving disk, and a U-shaped rock-lever provided with a starting arm extending alongside the exposed face of the driving disk and with a stopping arm extending alongside the exposed face of the friction disk and adapted to engage said stop element, and means including a treadle device for operating said rock-lever to carry its starting arm into engagement with said driving disk and its stopping arm into ineffective position.

9. In stop-motion mechanism for sewing machines, the combination with a driving shaft and a friction disk fixed to said shaft and provided with a laterally projecting hub, of a driving wheel slidingly mounted upon said hub, a spring normally pressing said driving wheel out of engagement with said friction disk, a stop element projecting from said friction disk and having an inclined surface, a rock-lever provided with a shifting arm for the driving wheel, and with a brake arm adapted to coöperate with said stop element, a spring connected to and normally rotating bodily with said friction disk, a trip element carried by said rock-lever, and means for operating said rock-lever to retract said shifting arm and simultaneously to carry said trip element into operative relation with said friction disk spring and said brake arm into engagement with said stop element.

10. In stop-motion mechanism for sewing machines, the combination with a driving shaft and a friction disk fixed to said shaft and provided with a laterally projecting hub and with an annular chamber surrounding said hub, of a coiled spring received within said chamber and secured at one end to said disk, a collar loosely mounted upon said hub and carrying a pin projecting within and movable relatively to said annular chamber and connected to the opposite end of said coiled spring, a stop shoulder upon said collar, a driving wheel movable into and out of engagement with said friction disk, a rock-lever provided with a shifting arm for said driving wheel, a stop arm carried by said rock-lever and adapted to engage the shoulder of said collar, and means for operating said rock-lever to retract said shifting arm and carry said stop arm into engagement with the shoulder upon said collar.

In testimony whereof, we have signed our names to this specification, in the presence of two subscribing witnesses.

HERBERT CORRALL.
JAMES MOIR FORBES.

Witnesses:
  Thomas Bishop Graham,
  Henry Mason.

Copies of this patent may be obtained for five cents each, by addressing the "Commissioner of Patents, Washington, D. C."